United States Patent [19]

Braun

[11] Patent Number: 4,462,099

[45] Date of Patent: Jul. 24, 1984

[54] ERROR SOURCE EXCLUDING DATA TRANSMISSION SYSTEM

[75] Inventor: Fritz Braun, Bolligen, Switzerland

[73] Assignee: Hasler AG Bern, Bern, Switzerland

[21] Appl. No.: 319,426

[22] Filed: Nov. 9, 1981

[30] Foreign Application Priority Data

Nov. 13, 1980 [CH] Switzerland .................. 8430/80

[51] Int. Cl.³ .............................................. G06F 11/00
[52] U.S. Cl. ......................................... 371/22; 371/5; 371/8
[58] Field of Search .................. 371/8, 22, 5; 364/200

[56] References Cited

U.S. PATENT DOCUMENTS

| | | | |
|---|---|---|---|
| 3,787,627 | 1/1974 | Abramson et al. | 370/92 |
| 3,886,318 | 5/1975 | Charransol et al. | 371/8 |
| 4,002,842 | 1/1977 | Meyr et al. | 179/15 AL |
| 4,011,542 | 3/1977 | Baichtel et al. | 371/8 |
| 4,017,828 | 4/1977 | Watanabe et al. | 371/8 |
| 4,048,446 | 12/1975 | Hafner et al. | 179/15 AL |
| 4,186,380 | 1/1980 | Edwin et al. | 371/8 |
| 4,227,221 | 10/1980 | Kanazawa | 371/8 |
| 4,276,643 | 6/1981 | Laprie et al. | 371/8 |
| 4,291,408 | 9/1981 | Ogawa et al. | 371/22 |
| 4,320,508 | 3/1982 | Takezoe | 371/22 |
| 4,363,123 | 12/1982 | Grover | 371/22 |

OTHER PUBLICATIONS

D. J. Lem, IBM Tech. Disl. Bull. vol. 13, No. 8 (Jan. 1971) pp. 2184–2185.

Hayes et al., Bell System Tech. J. vol. 50, No. 9 (1971) pp. 2947–2951.

Hafner et al., 1976 International Zurich Seminar on Digital Communications Proceeding, pp. D4.1 and D4.5.

*Primary Examiner*—Joseph F. Ruggiero
*Assistant Examiner*—Michael R. Fleming
*Attorney, Agent, or Firm*—Horst M. Kasper

[57] ABSTRACT

A data transmission system comprising a plurality of terminal units each having at least one input and at least one output connected such that each connected input of a terminal unit is connected to a connected output of another terminal unit. Each terminal unit with at least two input connections comprises a changeover switch to provide for incoming signal induced connecting of one of the inputs to a receiver circuit for recognizing and receiving certain signals. A test circuit is connected to the receiver circuit for determining if the test signals received are free from errors. An error sum counter is connected to the test circuit and to the changeover switch. At least one of the terminal units comprises an emitting provision for test signals, which is connected to the outputs of the terminal unit to provide for checking of the functioning of the transmission system. For each missing or defective test signal train received an error message is fed to the error sum counter for increasing the count value. Simultaneously an error signal generator provides an output error signal.

29 Claims, 3 Drawing Figures

ERROR SOURCE EXCLUDING DATA TRANSMISSION SYSTEM

BACKGROUND OF THE INVENTION

1. Field of the Invention

The invention relates to a method and to a data transmission system, which is maintained upon the appearance of locally limited error sources in comparison with the full system by systematic exclusion of such error sources.

2. Brief Description of the Background of the Invention Including Prior Art

Sizable data transmission systems in general have to show a high degree of availability. However, in principle, errors reducing the availability cannot be excluded and redundant building components have to be incorporated in order to nevertheless fulfil the requirement of availability. In addition steps have to be taken for the continuous and periodic supervision of the functioning of the provisions.

U.S. Pat. No. 4,048,446 to Hafner et al. teaches an annular, redundant data transmission system, where each subscriber station is braid-like connected to in each case two or more according to the signal path preceding and a corresponding number of according to the signal path following other subscriber stations. Upon failure of one subscriber station or of a transmission line section the substantially in parallel running transmission lines in each case bridge the source of error. Thus upon a locally limited error source no grave interference occurs of the transmission system as such. Only the traffic with the bridge subscriber stations is interrupted.

The reference does not indicate according to which criteria the subscriber stations in each case are connected to their input lines.

Hafner et al. in Proceedings 1976 International Zurich Seminar on Digital Communications, Page D4.1 teach the enhancing of the availability of a loop system by meshing. The various loops shown in this reference have two inputs and two outputs at each station independent of the number of parallel paths. Such limitation can be awkward at times.

SUMMARY OF THE INVENTION

1. Purposes of the Invention

It is an object of the present invention to provide a system which achieves that in case of local error sources in a data transmission system only the locations of the error source are bridged by parallel connected lines.

It is another object of the present invention to provide messages by way of which the location of the error source is indicated to a surveillance station in order to allow for the initiation of planned steps for the elimination of the error source.

It is further object of the present invention to provide a terminal unit adapted to automatically select from a number of input lines those lines carrying unacceptable error rates.

These and other objects and advantages of the present invention will become evident from the description which follows.

2. Brief Description of the Invention

The present invention provides a data transmission system which comprises a plurality of terminal units each having at least one input and at least one output connected such that each connected input of a terminal unit is connected to a connected output of another terminal unit. Each terminal unit with at least two input connections comprises a changeover switch to provide for signal induced connecting of one of the inputs, a receiver circuit connected to the changeover switch for recognizing and receiving certain signals, a test circuit connected to the receiver circuit for determining if the test signals received are free from errors, an error sum counter connected to the test circuit and to the changeover switch. At least one of the terminal units comprises an emitting provision for test signals connected to the output of the terminal unit to provide for checking of the functioning of the transmission system.

It can be provided that two terminal units have at most one direct connection between themselves. Each terminal unit with at least two input connection can further comprise means for providing an error signal connected to the error sum counter and to the outputs of the terminal unit. Each error sum counter can increase for each error coming through an input its count by a value corresponding to the error and can decrease for each error signal coming through an input its count by a value corresponding to the error signal. Each terminal unit with at least two input connections can further comprise comparison means connected to the error sum counter for comparison the rate of change in the error sum count versus time with a preset rate value and connected to the changeover switch for connecting to another input line the time averaged error sum rate surpassing the preset rate value. Each terminal unit with at least two input connections cna further comprise a time counter to be started simultaneous with the error counting and comparison means connected to the time counter and to the error sum counter for determining if upon reaching of the preset error count the time counter has surpassed a preset interval or not.

Each terminal unit with at least two input connections can further comprise a clock providing a signal upon passage of a certain time interval and comparison means connected to the error sum counter and to the clock for determining if the error sum count determined in the error sum counter during the time interval is larger or smaller than a preset counting value. Preferably, the error count coordinated to a missing test signal is larger than the error count coordinated to a defective test signal. The lines connecting the terminal units can form a loop. Each terminal unit with at least two input connections can further comprise control means connected to the receiver and to the changeover switch for systematically excluding of locally limited error sources in the transmission system as compared with the total extent of the system by providing for a corresponding switching of the connecting lines. There is also provided a data transmission terminal unit for receiving signals from at least two data paths, which comprises a changeover switch to provide for signal induced connecting and disconnecting of the respective inputs, a receiver circuit for recognizing and receiving certain signals coming from an input and connected to the changeover switch, a test circuit connected to the receiver circuit for determining if the test signals are free from errors, and error sum counter connected to the test circuit and to the changeover switch and a multiplexer connected to the receiving circuit, to the error sum counter and to at least one output.

An emitting provision can be connected to the outputs of the terminal units for providing test signals to check the functioning of the system incorporating such terminal units. An error signal generator can be connected to the test circuit and to the multiplexer. An alarm indicator can be connected to the error sum counter and to the multiplexer. A clock generator can be connected to the changeover switch. A timer clock can be connected to the clock generator and to the test circuit for providing time interval signals to the test circuit. A timer clock can be connected to the clock generator and to the error sum counter for providing time interval signals to the error sum counter. A control circuit can be connected to the receiving circuit and to the changeover switch for providing resetting of the changeover switch. A data emitter can be connected to the multiplexer for putting together signals to be emitted by the terminal unit and for feeding these signals to the multiplexer.

Further, there is provided a method for maintaining the functioning of a data transmission system which comprises connecting at least two data input lines to a terminal unit, feeding to the data input lines test signals originating from a source via different transmission paths, entering the incoming signals into a changeover switch for passing only signals from a signal selected transmission path, receiving the signal passed by the changeover switch in a receiver for recognizing certain signals, testing the output of the receiver in a test circuit, counting the errors determined in the test circuit with an error sum counter, and switching the changeover switch upon determination of a sufficient error sum count in the error sum counter.

The test signals can be provided according to a rigid time cycle. The output of the terminal unit to be tested can correspond to the input test signals. An error message can be fed from the test circuit to an error signal generator for providing an error signal to a multiplexer of the terminal unit. The count in the error sum counter can be increased upon receiving an error message from the test circuit by a corresponding value and the count in the error sum counter can be decreased upon receiving an error signal in the input from an error signal generator of a preceding terminal unit by a corresponding value.

The rate of change of the error sum counter value over time can be compared with a preset threshold value and a changeover signal can be provided to the changeover switch upon the rate of change exceeding the preset rate threshold. The average rate of change in error sum count can be determined by comparing after the reaching of a preset count value if the timer started at the same time as the counting has surpassed a preset time interval or not. After a preset time interval it can be tested if the error sum counter value reached during the preset time interval is larger or smaller than a preset value for determining the average rate of the change in the error sum counter value. The error sum count value can be increased by a larger amount upon finding a test signal missing as compared to the amount corresponding to an error containing test signal.

The inputs and the outputs of a plurality of terminal units can be connected such that there is only one direct connection between two terminal units, which runs from the output of one of the terminal units to the input of the second terminal unit. The data can be exchanged between the terminal units via code-addressed signals. Locally limited error sources can be excluded in the transmission system of the plurality of terminal units as compared to the total extent of the system by providing for a corresponding switching of the system to a parallel connecting line.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

Figure 1:
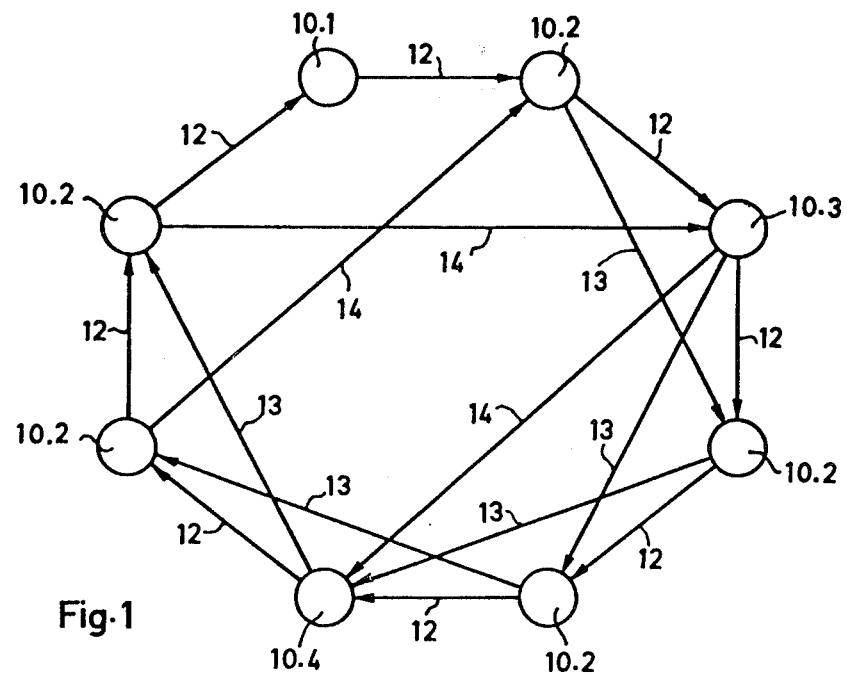
FIG. 1 is a view of a schematic diagram showing a circular data transmission system.

In accordance with the present invention, there is provided a method for maintaining the functioning of a digital data transmission system upon appearance of error sources local with respect to the spacial extension of the system by systematic excluding of these error sources. The System and its components are provided with the following properties:

The system comprises a plurality of terminal units connected in series of which each is connected to at least one input line with a corresponding number of preceding terminal units as seen in the direction of signal advance and to at least one output line with a corresponding number of following terminal units as seen in the direction of signal advance. The system comprises at least one monitoring station, which emits test signals for testing the functioning of the system. Each terminal unit which has at least two input lines is provided with a changeover switch through which the terminal unit is as selected by the signal connected to one of its input lines. The data transmission is performed via data signals in exclusively one signal direction by passing the data signals from terminal unit to terminal unit. Each terminal unit comprises a receiver circuit for recognizing and for receiving of data signals intended for being received.

The system is characterized by the following method steps:

One of the surveillance stations emits continuously test signals according to a substantially rigid time cycle, which test signals are directed to substantially all terminal units. A test circuit of each terminal unit compares if at the time intervals given by the time cycle of the surveillance station in each case a test signal is received and if this is the case, further if the test signal is free from errors. Each terminal emits for each missing or faulty test signal a corresponding error signal to the incorporated error sum counter and further an error signal to all following terminal units, which are connected via a line directly to an output of the terminal unit. Each error sum counter increases for an error received by the own terminal unit its count value by a corresponding amount and decreases for each error signal emitted by a prior terminal unit and received its error sum count value by a corresponding amount. In each terminal unit the rate of the error sum counter value change is compared with at least one preset rate threshold value and the changeover switch, if the time averaged rate surpasses the threshold rate value, switches to another one of the input lines.

The average rate of the change over time of the error sum counter value can be determined by comparing after reaching of a preset count value, if a time counter started simultaneously with the error counting has surpassed a preset time interval or not.

The average rate of the change of the error sum counter value over time can be determined by comparing in each case upon passage of a preset time interval, if the error sum counter value reached during the time interval is larger or smaller as a preset count value.

The amount coordinated to a missing test telegram can be larger than the amount coordinated to an error containing test telegram. The data exchange between the terminal units of the ring-shaped data transmission system can be performed with code-addressed signals.

The method is applicable for all transmission provisions with a single direction of transmission. It is particularly suited for annular systems, where all data are transmitted in exclusively one direction.

Referring now to FIG. 1 there is shown a data transmission system similar to that of U.S. Pat. No. 4,048,446 and having a plurality of terminal or subscriber units 10.1 to 10.4, which are connected annularly to each other via connecting lines 12. The information or data exchange is performed by way of code-addressed message packages in exclusively one direction, which is indicated by the arrow heads. The terminal unit 10.1 is connected to a single input line and to a single output line, the terminal units 10.2 are in each case connected to two input lines and to two output lines, the terminal unit 10.3 is provided with three output lines and the terminal unit 10.4 is connected to three input lines.

The lines 12 together with the terminal units 10 form a closed ring circuit. The other transmission lines 13 and 14 serve as redundant lines, by by-passing like a braid in each case one or several terminal units 10.

Each terminal unit 10.2 to 10.4 is provided with a changeover switch (not shown) via which they are in each case relative to the signal connected to one of their input lines 12, 13 or 14. In the general, error-free state each terminal unit is connected to its input line 12. If, however, one of the lines 12 is interrupted or if one of the terminal units is defective, then the error source can be by-passed without problem by switching over the terminal unit following immediately next to the error source with respect to its input signal to the other of its input lines 13 or 14. Therewith it can be excluded that a single error source causes a total collapse of the data transmission system.

A specially equipped terminal unit such as the unit 10.4 emits at a substantially rigid point in time test signal trains to the other terminal units for surveillance of the data transmission system. By receiving, evaluating and reemitting of these test signal trains in each case the functioning or non-functioning of the complete transmission system can be easily determined.

Figure 2:
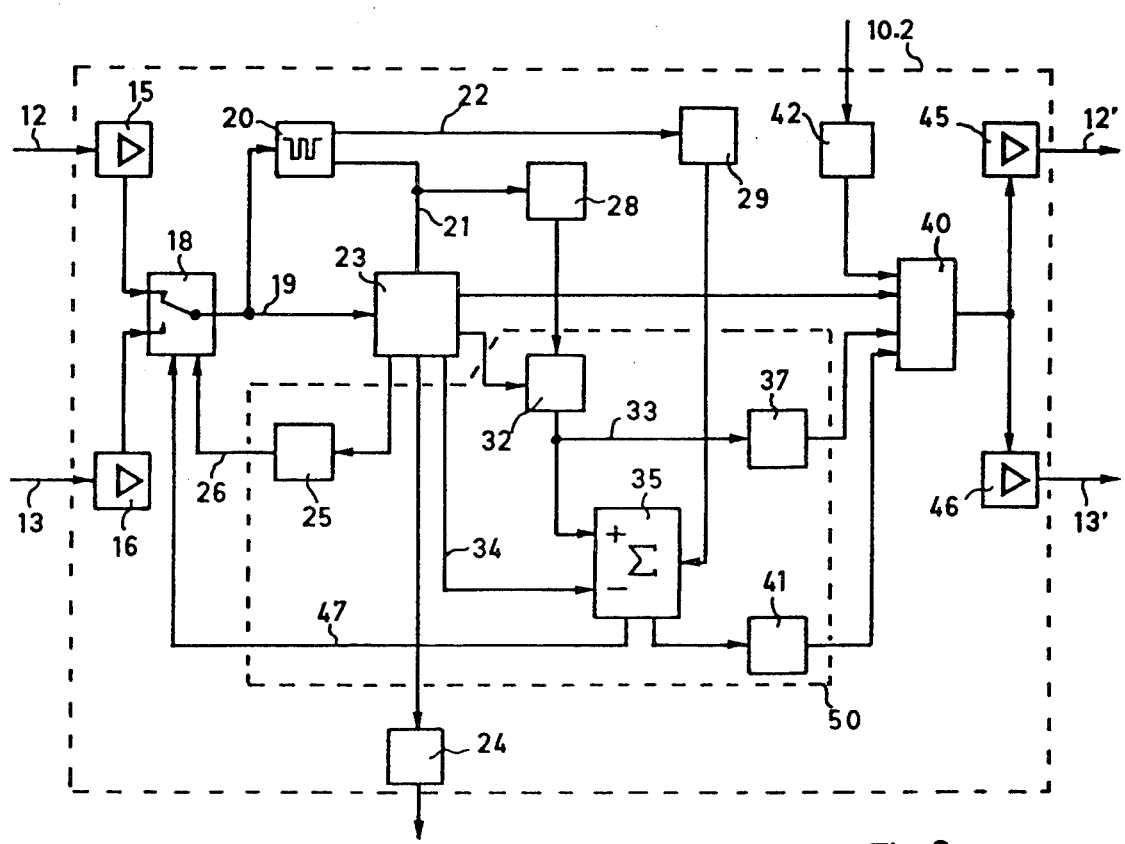
FIG. 2 is a view of a block diagram showing the circuit of a terminal unit.

FIG. 2 shows a block diagram of a terminal unit 10.2. The input lines are designated according to FIG. 1 as 12 and 13. They are connected to the input amplifier 15 or respectively 16, which serve for regeneration and amplification of the incoming data transmission signals. The already mentioned changeover switch is designated as 18, which is symbolically shown as a relais switching contact. In the regular situation the changeover switch 18 connects the line 12 with respect to the signal with the subcomponents described in the following.

A clock generator 20 is connected on the one hand to the output 19 of the changeover switch 18 and provides at its outputs 21 and 22 clock signals, which are synchronous to the input clock cycle frequency. On the other hand a receiver circuit 23 is connected to the changeover switch 18 for receiving all incoming data and other signals and the receiver circuit for example serves for decoding the addresses of the data signals and for the separating of copies of the signals intended for the terminal unit. Depending on their contents the signals are transmitted to the units 24, 25, 32, 35 or 40.

24 is an adapter circuit which processes the received data transmissions which are intended for a final device (not shown) connected to the terminal unit 10.2. The final devices can include data terminals, teletype apparatus, digitally operating telephones, teleprinters, telecopiers, picture telephones and the like. 25 is a control unit to which control signals are fed and which for example switches the changeover switch 18 via line 26 based on a received control signal.

28 and 29 are two time clock units, which derive from the cycle of the clock generator 20 periodic time intervals of constant length, which are large as compared to the period of the transmission cycle and where the intervals of the unit 29 in turn are again large versus those of the unit 28 and where the latter essentially correspond to the cycle of the emission of the test signals via the terminal unit 10.4.

32 represents a test circuit which investigates separated copies of test signals with respect to being free from errors. If the test circuit 32 determines an error in a test signal or if the test circuit notices the absence of a test signal, then a corresponding error message is transmitted via its output line 33 to the still to be described units error sum counter 35 and error signal generator 37.

The error sum counter 35 comprises a forward-backward counter device with a forward counting input (+) and a backward counting input (−). The first is connected to the test circuit 32 and the latter is connected to the receiver circuit 23. The error signal generator produces for each error message of the test circuit an error signal train, which is fed to the multiplexer 40.

41 is an alarm indicator having its input connected to an output of the error sum counter 35. It composes an alarm signal based on each error message from the error sum counter 35 and feeds it to the multiplexer 40. 42 is a data emitter, which composes general data signal trains to be emitted by the terminal unit 10.2 and feeds these also to the multiplexer 40.

The multiplexer 40 switches the signal trains to be emitted by the units 23, 37, 41 and 42 to the output lines 12' and 13' via the output amplifiers 45 and 46. The multiplexer 40 takes care that the signal trains are emitted as a continuous flow of data at the proper cycle. If no signal trains are present to be emitted then empty signal trains are emitted.

The method for the maintaining of the functioning of the data transmission according to FIG. 1 is now as follows: The changeover switches 18 connect in general the input lines 12 with the recever circuits 23 in each terminal unit 10.2 to 10.4. The receiver circuits 23 compare continuously the incoming signal trains. Corresponding to addresses and control information signal trains are continuously removed from the flow of other signal trains and are transmitted to one of the units 24, 25, 32 or 35 or are fed to the multiplexer 40. The test circuit 32 checks the test signal trains with respect to freedom from errors. For each defective test signal train such as for example with a bit error in the signal train the test circuit 32 provides an error message both to the forward counter input (+) of the error sum counter 35 as well as to the error signal generator 37. A corresponding, however with a higher evaluation factor attached, error message occurs if the test circuit 32 determines that one of the test signal trains emitted in regular intervals by the terminal unit 10.4 was not received, since it for example got lost under way or became mutilated or since a line was interrupted or the like. For this purpose the test circuit 32 is provided with the time intervals by the timer clock unit 28 and the duration of the time intervals is equal to the cycle period of the test signal train emitted by the terminal unit 10.4. Thus it is provided that a test signal train falls in each case exactly into each time interval.

The error sum counter 35 counts the errors signaled under consideration of the evaluation factor given in each case. The error signal generator 37 at the same time composes for each error message an error signal train. This is sent via lines 12' and 13' exclusively to the terminal units, which in each case follow directly to the emitting terminal unit. Every terminal unit receiving such an error signal train, which is recognized by the receiver circuit 23, passes via lines 34 a corresponding error message to the backward counter input (−) of the error sum counter 35, whereby the count value of the error sum counter 35 is decreased by an amount corresponding to the signalled error. At the same time the error signalling train is destroyed.

In this manner at each terminal unit exclusively those errors contribute to the increase in the count value of the error sum counter 35, which are registered solely by the corresponding terminal unit and not also by a terminal unit preceding in the direction of signal flow.

A time cycle is impressed to each error sum counter 35 via the coordinated timer clock unit 29 such that from the count value of the error sum counter 35 and from this time cycle an average error rate can be estimated. If the error rate is larger than a first preset error rate value, then an alarm signal train is emitted to the terminal unit 10.4 via the alarm indicator 41. If the error rate surpasses a second higher error rate value then the changeover switch 18 is switched via line 47 to the input line 13 and this is signalled to the terminal unit 10.4 by way of another error signal train.

The subdivision of the error rate into three regions "error rate low", "error rate increased" and "error rate unacceptably high" can be provided by two independent counters in the error sum counter 35 counting simultaneously the error messages. Each counter checks upon reaching of a counting value preset for it, where the counting values can be of differing size, if the time intervals of uniform length and determined by the timer clock unit 29 and started in each case with the commencing of counting have been finished or not in each case. If the coordinated time interval has already passed, then the average error rate is in each case smaller than the rate, which corresponds to the quotient of the preset counting value and the time interval. However, if the time interval has not passed, then the average error rate is larger than the recited rate and as described an alarm indication is provided or the changeover switch is switched.

It is also possible to check in each case after the termination of the time interval started with the commencing of counting, if the counter of the error sum counter 35 has reached a preset counting value or not. If one or the other of the preset and as a threshold serving counting values was reached or even surpassed, then corresponding to the preceding paragraph an alarm indication or the like results. It is advantageous, in each case to commence the next test cycle directly after the termination of one test cycle, that is the counter is reset to zero and the next count is started.

The described method for maintaining the functioning of the data transmission system provides the following advantages:

In case of an error and independent from any central evaluation and surveillance station in each case only the changeover switch 18 is switched of that terminal unit, which in each case follows in the advance direction of the signal directly to the error source or respectively to the error generating location. This effects automatically the by-passing of the error source, whereby the remaining data transmission system remains or becomes again substantially capable of functioning.

Defects being announced and error sources determined are signalled with alarm signal trains, which allows to initiate appropriate steps for the elimination of the error.

The changing over of the changeover switch 18 is performed based on a certain averaging, which avoids faultry switching based on short term disturbances substantially.

The resetting of the changeover switch 18 into its starting position is performed after removal of the error cause by way of a control signal train, which acts on the line 26 via the coordinated receiver circuit 23 and the control unit 25. In contrast to an automatic resetting this procedure prevents that a changeover switch 18 under certain circumstances constantly oscillates in error between its two switching positions.

The procedure described and operating with the changeover switches 18, which corresponding to the requirements of the terminal units 10.2 and 10.3 are provided with two switching positions, can of course also be applied with terminal units 10.4 with multiple position changeover switches. In this case, however, it is necessary to introduce a criterium as to the sequence according to which the changeover switch connects the different input lines.

Figure 3:
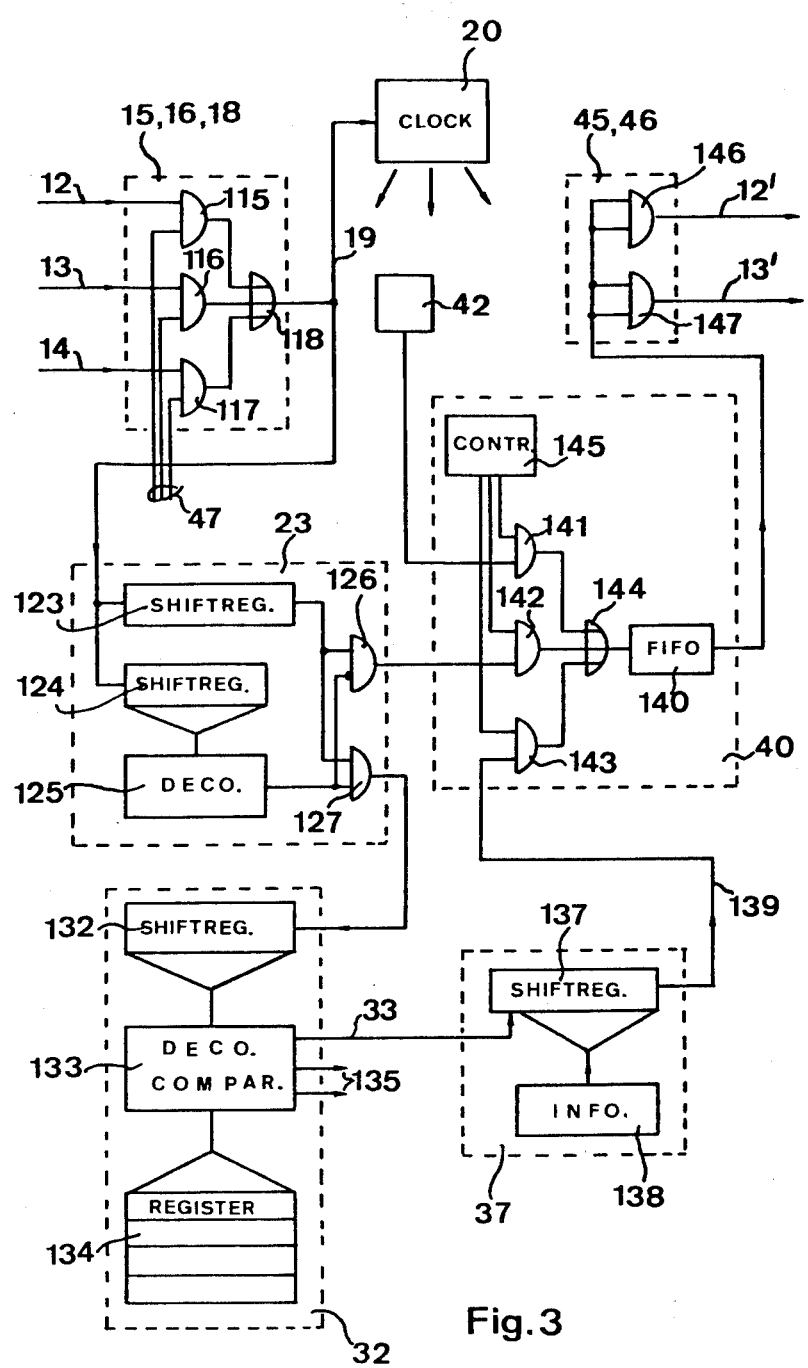
FIG. 3 is a more detailed view of several of the blocks shown in FIG. 2.

FIG. 3 shows some of the blocks of FIG. 2 in more detail. Via the connecting lines 12, 13 and 14 the signal trains reach the input amplifier (15, 16) and the switch 18, which are formed by three AND-gates and a following OR-gate 118. Always one of the AND-gates is in on-condition controlled by the control lines 47, while the other AND-gates are blocked. The signal trains of the line 12 reach via the AND-gate in on-condition such as for example 115 the line 19, which is as described connected to the clock generator 20 and to the receiver circuit 23. The clock generator 20 supplies the complete circuit with clock signals, which is indicated symbolically by three arrows.

The receiver circuit 23 comprises two parallel connected shift registers 123 and 124, into which the signal trains enter in series. The shift register 124 is connected in parallel to a detector. This detector reads in the address information of the signal trains and switches these on via an NAND-gate 126 or an AND-gate 127 to the multiplexer 40 and to the test circuit 32. This is possible since the shift register 123 is longer as the shift register 124 and thereby a relative delay is provided.

The test circuit 32 is provided with an additional shift register 123, into which signal trains to be tested run in. A decoder-comparison circuit 133 in the following compares thee contents of the shift register 132 with the contents of various registers 134. Such a process is known for example from the technology of microprocessors.

Depending on the result of the comparison various messages are provided via the exits 135. In case of a notice of an error immediately an error signal is fed to the error signal generator 37 via line 33. This error signal is entered into a shift register 137 wherein in addition an address and other information for a error signal train to be emitted is read in from a storage register 138. The finished signal train reaches the multiplexer 40 via line 139.

The multiplexer comprises a FIFO-storage (first-in-first-out) 140, several AND-gatees 141 ... 143, which serve as switches, an OR-gate 144 for the gathering and collecting of the outputs of the AND-gates and a control circuit 145 for opening and blocking of the AND-gates 141 ... 143. This control circuit 145 allows as soon as a signal train is present in the shift register 137, in the shift register 123 or in the data emitter 42, which is contructed like the error signal generator 37, to enter this signal train into the FIFO-storage and thereby the signal trains are multiplexed.

The signal trains leave the multiplexer 40 in the sequence of entering via two gates 146, 147 connected in parallel, which form the output amplifiers 45 and 46, and reach the output connecting lines 12' and 13'.

The method has been described by way of a circular transmission system. Such a transmission system can be far extended such as for example in a single family home development, can be less extended such as for example in a manufacturing plant or it can be relatively limited such as for example within the floor of a building having connected autonomous computers. Independent of the spacial extension the method of the present invention allows to exclude error sources, which are spacially very localized relative to the total transmission system. This means that all errors, which occur in a single transmission line or in a single terminal unit can be registered. However, coupled errors affecting parallel disposed transmission lines 12, 13 and/or 14 simultaneously or simultaneous coupled or independent defects of two or more directly following terminal units 10 are not registered. If a terminal unit 10.4 is by-passed, which is specially equipped as described for the emission of test signal trains, then of course the function has to be taken over by another terminal unit correspondingly equipped.

the method is in addition to circular transmission systems also applicable with linear transmission lines for a single transmission direction, where the transmission lines are put in redundantly like a braid and are connected to the terminal units or to correspondingly equipped regenerator units.

Furthermore, the method can be applied to all digital transmission systems, which instead of a code-addressing employ fixed time coordinations and/or frame synchronizations such as for example PCM pulse code modulation transmission lines. Here the address of the signal train does not form the criterium if the message is determined for the terminal unit or not, but a time slot number forms the criterium, which time slot number is fixedly coordinated within the frame synchronization.

It is to be noted further, that the embodiment shown in FIG. 2 can be varied in a variety of ways without resulting in a change of the method as such. For example variations are possible in the kind of the error sum counter, the kind of the error weighting and evaluation, the kind of the error message and/or signal and so on. For example, also the units 25, 32, 35, 37 and 41 can be combined to a surveillance unit 50 indicated with dashed lines, which essentially comprises a microprocessor, with the aid of which the function to be performed by the recited units are performed by a multiplex method.

It will be understood that each of the elements described above, or two or more together, may also find a useful application in other types of system configurations and signal transmitting and processing procedures differing from the types described above.

While the invention has been illustrated and described as embodied in the context of a data transmission system, of a data transmission terminal unit and of a method for maintaining the functioning of a data transmission system, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic and specific aspects of this invention.

What is claimed as new and desired to be protected by Letters Patent is set forth in the appended claims:

1. A data transmission system comprising a plurality of terminal units each having at least one input and at least one output connected such that each connected input of a terminal unit is connected to a connected output of another terminal unit, where each terminal unit includes a means for determining the functioning of the transmission operation and where each terminal unit with at least two input connections comprises a changeover switch to provide for signal induced connecting of one of the inputs;

a receiver circuit connected to the changeover switch for recognizing and receiving certain signals coming from the changeover switch and providing certain test signals;

a test circuit connected to the receiver circuit for determining if the test signals received are free from errors;

an error sum counter connected to the test circuit and to the changeover switch for increasing the error count by an amount corresponding to the error type received at the input;

means for providing an error signal connected to the error sum counter and to the outputs of the terminal unit such that the following terminal units are informed about the error; and where at least one of the terminal units comprises means for emitting test signals connected to the output of the terminal unit to provide for checking of the functioning of the transmission system.

2. The data transmission system according to claim 1 wherein two terminals have at most one direct connection between themselves.

3. The data transmission system according to claim 1 wherein each error sum counter increases for each error coming through an input its count by a value corresponding to the error; and decreases for each error signal coming through an input its count by a value corresponding to the error signal.

4. The data transmission system according to claim 1 wherein each terminal unit with at least two input connections further comprises comparison means connected to the error sum counter for comparing the rate of change in the error sum count versus time with a present rate value and connected to the changeover switch for connecting to another input line upon the time averaged error sum rate surpassing the preset rate value.

5. The data transmission system according to claim 1 wherein each terminal unit with at least two input connections further comprises a time counter to be started with the error counting; and comparison means connected to the time counter and to the error sum counter for determining if upon reaching of a preset error count the time counter has surpassed a preset interval or not.

6. The data transmission system according to claim 1 wherein each terminal unit with at least two input connections further comprises a clock providing a signal upon passage of a certain time interval; and comparison means connected to the error sum counter and to the clock for determining if the error sum count determined in the error sum counter during the time interval is larger or smaller than a present counting value.

7. The data transmission system according to claim 1 wherein the error count coordinated to a missing test signal is larger than the error count coordinated to a defective test signal.

8. The data transmission system according to claim 1 wherein the lines connecting the terminal units form a loop.

9. The data transmission system according to claim 1 wherein each terminal unit with at least two input connections further comprises control means connected to the receiver and to the changeover switch for systematically excluding of locally limited error sources in the transmission system as compared with the total extent of the system by providing for a corresponding switching of the connecting lines.

10. A data transmission terminal unit for receiving signals from at least two sources comprising a changeover switch to provide for signal induced connecting and disconnecting of the respective inputs;

a receiver circuit for recognizing and receiving certain signals coming from an input and connected to the changeover switch;

a test circuit connected to the receiver circuit for determining if the test signals are free from errors;

an error sum counter connected to the test circuit and to the changeover switch;

a multiplexer connected to the receiving circuit, to the error sum counter for multiplexing the signals coming from the receiving circuit and coming from the error sum counter and connected to at least one output to provide a continuous flow of signal trains; and means for emitting connected to the outputs of the terminal units for providing test signals to check the functioning of a system incorporating such terminal units.

11. The data transmission terminal unit according to claim 10 further comprising an error signal generator connected to the test circuit and to the multiplexer.

12. The data transmission terminal unit according to claim 10 further comprising an alarm indicator connected to the error sum counter and to the multiplexer.

13. The data transmission terminal unit according to claim 10 further comprising a clock generator connected to the changeover switch.

14. The data transmission terminal unit according to claim 13 further comprising a timer clock connected to the clock generator and to the test circuit for providing time interval signals to the test circuit.

15. The data transmission terminal unit according to claim 13 further comprising a timer clock connected to the clock generator and to the error sum counter for providing time interval signals to the error sum counter.

16. The data transmission terminal unit according to claim 10 further comprising a control circuit connected to the receiving circuit and to the changeover switch for providing resetting of the changeover switch.

17. The data transmission terminal unit according to claim 10 further comprising a data emitter connected to the multiplexer for putting together signals to be emitted by the terminal unit and for feeding these signals to the multiplexer.

18. A method for maintaining the functioning of a data transmission system comprising connecting at least two data input lines to a terminal unit; feeding to the data input lines test signals originating from a source via different transmission paths; entering the incoming signals into a changeover switch for passing only signals from a signal selected transmission path;

receiving the signal passed by the changeover switch in a receiver for recognizing certain signals;

testing the output of the receiver in a test circuit; counting the errors determined in the test circuit with an error sum counter; and switching the changeover switch upon determination of a sufficient error sum count in the error sum counter via a signal transmitted from the error sum counter to the changeover switch.

19. The method for maintaining the functioning according to claim 18 where the test signals are provided according to a rigid time cycle.

20. The method for maintaining the functioning according to claim 18 wherein the output of the terminal unit to be tested corresponds to the input test signals.

21. The method for maintaining the functioning according to claim 18 further comprising feeding an error message from the test circuit to an error signal generator for providing an error signal to a multiplexer of the terminal unit.

22. The method for maintaining the functioning according to claim 18 further comprising
increasing the count in the error sum counter upon receiving an error message from the test circuit by a corresponding value; and
decreasing the count in the error sum counter upon receiving of an error signal in the input by a corresponding value.

23. The method for maintaining the functioning according to claim 18 further comprising
comparing the rate of change of the error sum counter value over time with a preset rate threshold and providing a changeover signal to the changeover switch upon the rate of change exceeding the present rate threshold.

24. The method for maintaining the functioning according to claim 18 further comprising
determining the average rate of change in error sum count by comparing after the reaching of a preset count value if the timer started at the same time as the counting has surpassed a preset time interval or not.

25. The method for maintaining the functioning according to claim 18 further comprising
testing after a preset time interval if the error sum counter value reached during the preset time interval is larger or smaller than a preset value for determining the average rate of the change in the error sum counter value.

26. The method for maintaining the functioning according to claim 18 further comprising
increasing the error sum count value by a larger amount upon finding a test signal missing as compared to the amount corresponding to an error containing test signal.

27. The method for maintaining the functioning according to claim 18 further comprising
connecting the inputs and outputs of a plurality of terminal units such there is only one direct connection between two terminal units, which runs from the output of one of the terminal units to the input of the second terminal unit.

28. The method for maintaining the functioning according to claim 27 further comprising
exchanging data between the terminals via code-addressed signals.

29. The method for maintaining the functioning according to claim 27 further comprising
excluding locally limited error sources in the transmission system of the plurality of terminal units as compared with the total extent of the system by providing for a corresponding switching of the system.

* * * * *